(12) United States Patent
Haarberg et al.

(10) Patent No.: US 7,475,472 B2
(45) Date of Patent: Jan. 13, 2009

(54) SYSTEM FOR ASSEMBLING A CUSTOMIZED PRINTED CIRCUIT BOARD

(75) Inventors: Neal H. Haarberg, Portland, OR (US); Tommy T. Tang, Clackamas, OR (US)

(73) Assignee: Milegon LLC, Milwaukie, OR (US)

( * ) Notice: Subject to any disclaimer, the term of this patent is extended or adjusted under 35 U.S.C. 154(b) by 185 days.

(21) Appl. No.: 11/216,304

(22) Filed: Aug. 31, 2005

(65) Prior Publication Data
US 2006/0053341 A1    Mar. 9, 2006

Related U.S. Application Data

(60) Provisional application No. 60/606,024, filed on Aug. 31, 2004.

(51) Int. Cl.
*B23P 19/00* (2006.01)
(52) U.S. Cl. .................. 29/739; 29/564; 29/564.1; 29/740
(58) Field of Classification Search .................. 29/564, 29/564.1, 739, 740
See application file for complete search history.

(56) References Cited

U.S. PATENT DOCUMENTS

| | | | | |
|---|---|---|---|---|
| 5,809,639 | A * | 9/1998 | Alvite | 29/740 |
| 5,894,571 | A * | 4/1999 | O'Connor | 713/2 |
| 5,933,349 | A * | 8/1999 | Dalgleish et al. | 700/121 |
| 6,080,207 | A * | 6/2000 | Kroening et al. | 717/172 |
| 6,110,213 | A * | 8/2000 | Vinciarelli et al. | 703/1 |
| 6,230,067 | B1* | 5/2001 | White | 700/112 |
| 6,378,200 | B1* | 4/2002 | Lim et al. | 29/832 |
| 6,402,028 | B1* | 6/2002 | Graham et al. | 235/380 |
| 6,687,986 | B2* | 2/2004 | White | 29/832 |
| 6,775,829 | B1* | 8/2004 | Kroening | 717/175 |
| 6,983,532 | B2* | 1/2006 | White | 29/740 |
| 7,003,871 | B2* | 2/2006 | Ray | 29/825 |
| 2001/0025413 | A1* | 10/2001 | Asai et al. | 29/832 |
| 2003/0059964 | A1* | 3/2003 | Kawai et al. | 438/14 |
| 2005/0071996 | A1* | 4/2005 | Ray | 29/829 |
| 2006/0272141 | A1* | 12/2006 | Rudduck et al. | 29/407.09 |

* cited by examiner

*Primary Examiner*—C. J Arbes
(74) *Attorney, Agent, or Firm*—Boyle Fredrickson, S.C.

(57) ABSTRACT

A system and a method are provided for assembling a customized printed circuit board having at least one electrical component. The system includes an input device for allowing a user to input predetermined information on the customized printed circuit board to be assembled. A central processing unit is operatively connected to the input device by a communications network, such as the internet. The central processing unit receives the predetermined information and generates assembly instructions in response to the predetermined information. A machine is operatively connected to the central processing unit for assembling the customized printed circuit board in response to the assembly instructions.

8 Claims, 6 Drawing Sheets

SYSTEM FOR ASSEMBLING A CUSTOMIZED PRINTED CIRCUIT BOARD

CROSS-REFERENCE TO RELATED APPLICATION

This application claims priority from U.S. Provisional Application Ser. No. 60/606,024, filed on Aug. 31, 2004.

FIELD OF THE INVENTION

This invention relates generally to printed circuit boards, and in particular, to a system and method for assembling a printed circuit board in accordance with a customized order placed on a website.

BACKGROUND AND SUMMARY OF THE INVENTION

As is known, a printed circuit board (PCB) includes a thin plate on which electronic chips and/or other electronic components are placed. Typically, the thin plate is fabricated from an insulating board that has a plurality of conducting tracks acting as circuit connections between a plurality of pins extending from the board. The conducting tracks on the insulating board allow for the ready connection of a plurality of electronic chips and/or electrical components to the pins projecting from the insulating board to form a circuit for ready installation in a machine. It can be appreciated that printed circuit boards are used in a wide variety of sophisticated electronic equipment, such as computers, copiers, printers and the like.

When designing sophisticated electronic equipment, manufacturers often utilize commercially available, mass-marketed PCBs in order to limit the costs associated with manufacturing the equipment. In many cases, the use of commercially available, mass-marketed PCBs is not possible. As a result, the manufacturers must design and produce custom PCBs to include in their products. However, customized PCBs are usually significantly more expensive than mass-marketed boards. In addition, there are often costs involved in evaluating various custom board designs and in obtaining cost estimates for each of the design alternatives. Further, there is often a significant time lag between the ordering and the delivery of a custom PCB. Consequently, there exists a need for a system and a method for quickly and reliably producing custom PCBs. There also exists a need for a method of assembling a PCB in accordance with customized specifications in a short turnaround time period. Further, there exists a need for quick and reliable method to quote a client a price for assembling a customized PCB.

Therefore, it is a primary object and feature of the present invention to provide a system and method for assembling a customized printed circuit board that is simple to utilize and that reliably assembles the printed circuit board in accordance with a client's instructions.

It is a further object and feature of the present invention to provide a system and method for assembling a customized printed circuit board that requires a shorter lead time than prior systems and methods.

It is a still further object and feature of the present invention to provide a system and method for assembling a customized printed circuit board that quickly and reliably quotes an estimated price for the assembled, customized printed circuit boards to a potential client.

In accordance with the present invention, a system is provided for assembling a customized printed circuit board having at least one electrical component. The system includes an input device for allowing a user to input predetermined information on the customized printed circuit board to be assembled. A central processing unit is operatively connected to the input device by a communications network, such as the internet. The central processing unit receives the predetermined information and generates assembly instructions in response to the predetermined information. A machine is operatively connected to the central processing unit for assembling the customized printed circuit board in response to the assembly instructions.

The input device includes an electronic order form for facilitating the input of the predetermined information. The electronic order form prompts the user to enter the predetermined information. For example, the electronic order form may prompt the user for billing information, a bill of materials for the customized printed circuit board and/or a graphic image of the customized printed circuit board. The predetermined information defines a customer file. The central processing unit includes a processor and a memory storing a software program. The software program is operable to instruct the processor to import the customer file from the input device and to generate an assembly file that includes assembly instructions for the machine. The assembly instructions allow the machine to select the at least one electrical component and to locate the at least one electrical component on the printed circuit board. The assembly file is then downloaded to the machine.

In accordance with a further aspect of the present invention, a system is provided for assembling a customized printed circuit board having a plurality of electrical components. The system includes an input device for allowing a user to input predetermined information regarding the customized printed circuit board to be assembled. The predetermined information includes a list of the plurality of electrical components. A central processing unit is operatively connected to the input device by a communications network, such as the internet. The central processing unit receives the predetermined information and generates assembly instructions in response to the predetermined information. A carrier supports the plurality of components on the list. A machine is operatively connected to the central processing unit for assembling the customized printed circuit board from the plurality of components supported on the carrier in response to the assembly instructions.

The carrier includes a base plate and a first strip plate mounted on the base plate for supporting a first set of the plurality of components thereon. The carrier may also include a second strip plate mounted on the base plate. The second strip plate supports a second set of the plurality of components thereon. A strip of tape may be used for affixing the plurality of components to the first strip plate.

The input device includes an electronic order form for facilitating the input of the predetermined information. The electronic order form prompts the user to enter the predetermined information. The predetermined information includes billing information, a bill of materials for the customized printed circuit board, and/or a graphic image of the customized printed circuit board.

In accordance with a still further aspect of the present invention, a method is provided for assembling one or more electrical components on a printed circuit board. The method includes the step of receiving a customer file from a remote user. The customer file contains a listing of the one or more electrical components to be assembled on the printed circuit board. An assembly file is generated for assembling the one or more electrical components on the printed circuit board. Thereafter, the printed circuit board is assembled in accordance with the assembly file.

The step of assembling the printed circuit board includes the additional steps of placing the circuit board components on plate-type carriers and positioning the carriers in the vicinity of a circuit board assembly machine. Thereafter, the circuit board components are selected from the plate-type carriers for assembling the components on the printed circuit board. The assembly file is downloaded to the circuit board assembly machine prior to assembling the printed circuit board.

It is contemplated for the method of the present invention to include the additional step of inputting predetermined information on the customized printed circuit board to be assembled. The predetermined information defines the customer file that is transmitted to a central processing unit over a communications network, such as the internet. The predetermined information includes billing information, a bill of materials for the customized printed circuit board and/or a graphic image of the customized printed circuit board.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
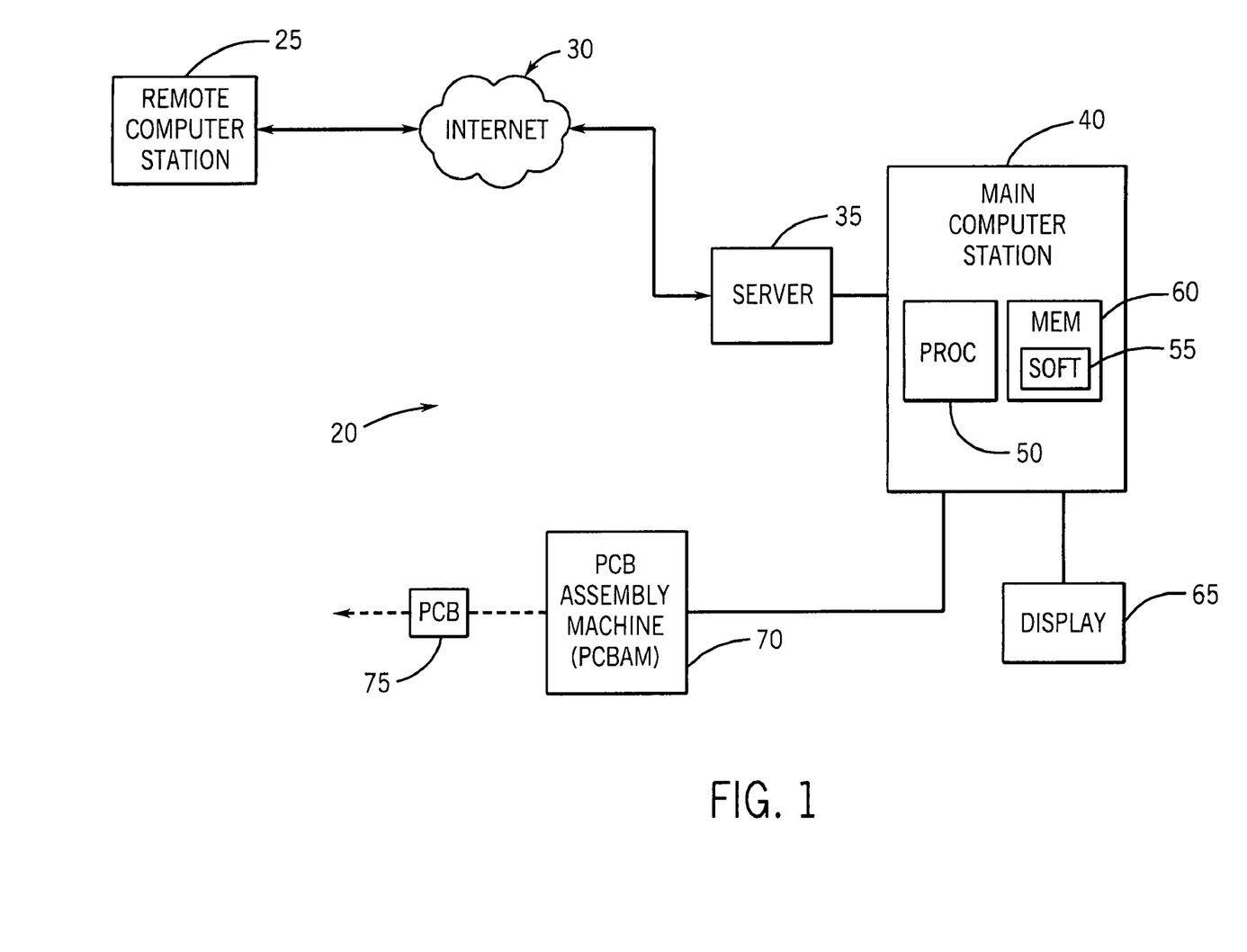
FIG. 1 is a schematic view of a system for assembling a customized printed circuit board in accordance with the present invention.

Referring to FIG. 1, a system employed to assemble a PCB and effectuating the methodology of the present invention is generally designated by the reference numeral 20. The system 20 generally includes a remote customer computer station 25 connected in a known manner via the internet 30 with a server 35. The server 35 is generally configured in a known manner to support a website for interacting with the remote computer station 25 via the internet connection 30. The server 35 communicates information to and from the remote computer station 25 in a known manner to a main computer station 40. The main computer station 40 generally includes a processor 50 operable in a known manner to execute a software program 55 stored on a memory 60 of the main computer station 40. The location of the software program and the server for the website can vary. The main computer station 40 is also connected to a display 65 to interact with an operator at the main computer station 40. The main computer station 40 is also connected to communicate with a PCB assembling machine (PCBAM) 70 configured to assemble the customized PCB 75. The software program 55 generally includes instructions to the processor 50 for executing the steps of the method 80 outlined below for assembling the PCB 75.

Figure 2:
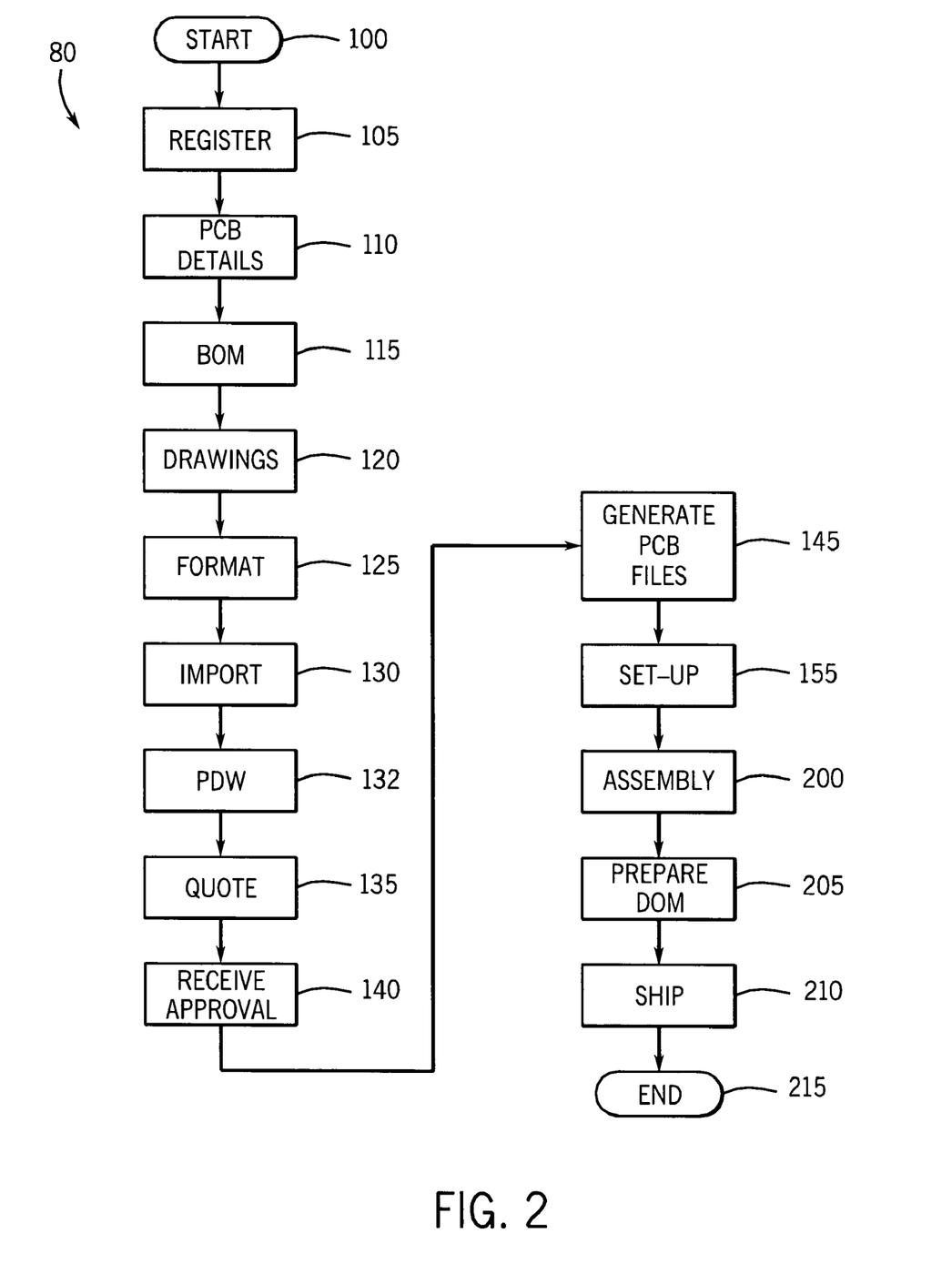
FIG. 2 is a flow chart of a method for assembling a customized printed circuit board in accordance with the present invention.

Referring to FIG. 2, step 100 is the start of the method 80. At step 105, a customer at the remote computer station 25 accesses the website and provides initial information to register on the website. The general registrant information includes name, address and billing information for payment of the customized order of PCBs. At step 110, the website prompts the customer to provide, and receives from the registrant, detailed information of the desired PCB, including but not limited to: desired board quantity, total number of unique parts, whether single sided or double sided surface mount technology (SMT) is to be assembled, the number of placements per PCB, and the desired quantity and turnaround time for the PCB order. At step 115, the website prompts, and receives from the registrant, a bill of materials (BOM). The BOM includes general information of the miscellaneous components to be attached to the PCB. The BOM information includes, but is not limited to, component part numbers, reference descriptions, general descriptions of the component, and any name designation to be included to the component on the PCB. At step 120, the website prompts and receives the drawings from that customer that are representative of the desired PCB to be manufactured. Generally, the desired drawings are silkscreen graphic images generally known to those skilled in the art for indicating placement and reference designators for the various components and pin designations of the PCB. The desired graphic image is generally a computer aided drawing (CAD) format. The drawing or graphic image should include, but is not limited to, a name of the component, an X coordinate for the component, a Y coordinate for the component, an angle of placement of the component on the PCB, whether the component is on the top or on the bottom of the PCB, and a reference designator of the component.

At step 125, the website formats the customer BOM, as well as, the customer supplied drawing(s) in appropriate format for uploading or importing into the memory in a readable format for use by software program. An example BOM format is illustrated in Table 1.

TABLE 1

| BOM Format | | | |
|---|---|---|---|
| Part Number | Reference Descript. | Descript. | Package |
| XXX | XXX | XXXX | XXXX |

An example format for the drawings is illustrated in Table 2.

TABLE 2

Drawing Format

| PLACE | X(units) | Y(units) | Theta (angle - degrees) | Top or Bottom | Reference Descript. |
|---|---|---|---|---|---|
| XXX | XXX | XXXX | XXXX | XXXX | XXX |

Step 130 includes uploading the submitted BOM files and drawing files for generating the desired PCB. Generally, the customer clicks an icon on the website to initiate uploading the files. The BOM and drawing files are uploaded to the software program 55. The preferable software program 55 is a spreadsheet in an Excel-format program, but the type of software program 55 can vary. Using the information in the files, step 132 includes generating a pattern definition window (PDW) that is displayed via the website to the remote computer station 25. The PDW generally shows an X-Y coordinate display of the desired PCB to the customer. The website may prompt the customer for certain minimum display parameters (e.g., X-Y coordinates of outline dimensions that cannot be larger than the actual dimensions of the PCB board). Step 135 includes generating a price quote for assembling and shipping the customized PCBs to the customer. Step 140 includes receiving customer approval for assembling and shipping the customized PCB. Step 145 includes generating the requisite PCB files containing the program instructions to instruct the PCBAM 70 to assemble the customized PCB and save the files in a temporary folder in the memory 60 at the computer station 40. The files generally include instructions in a machine readable format that can be downloaded to the PCBAM 70 for assembling the PCB. The machine language can vary and is not limiting on the invention. The operator initiates setup of the PCBAM for assembling the PCBs.

Step 155 includes initiating set-up of the files for instructing the PCBAM 70 to assemble the PCB 75 in accordance to the customer specifications in the BOM file and the drawings file. The set-up of the files includes locating and retrieving the stored BOM files from the memory 60, and executing the software program 55 to generate or create a component list for assembling the PCB 75. The software program 55 preferably generates the component list in a ".cmp" file and saves the file in the job folder with the BOM file. Step 155 further includes generating a kit list file (e.g., ".kit" file) that includes instructions for locating a component for assembly by the PCBAM 70 onto the PCB 75

Figure 3:
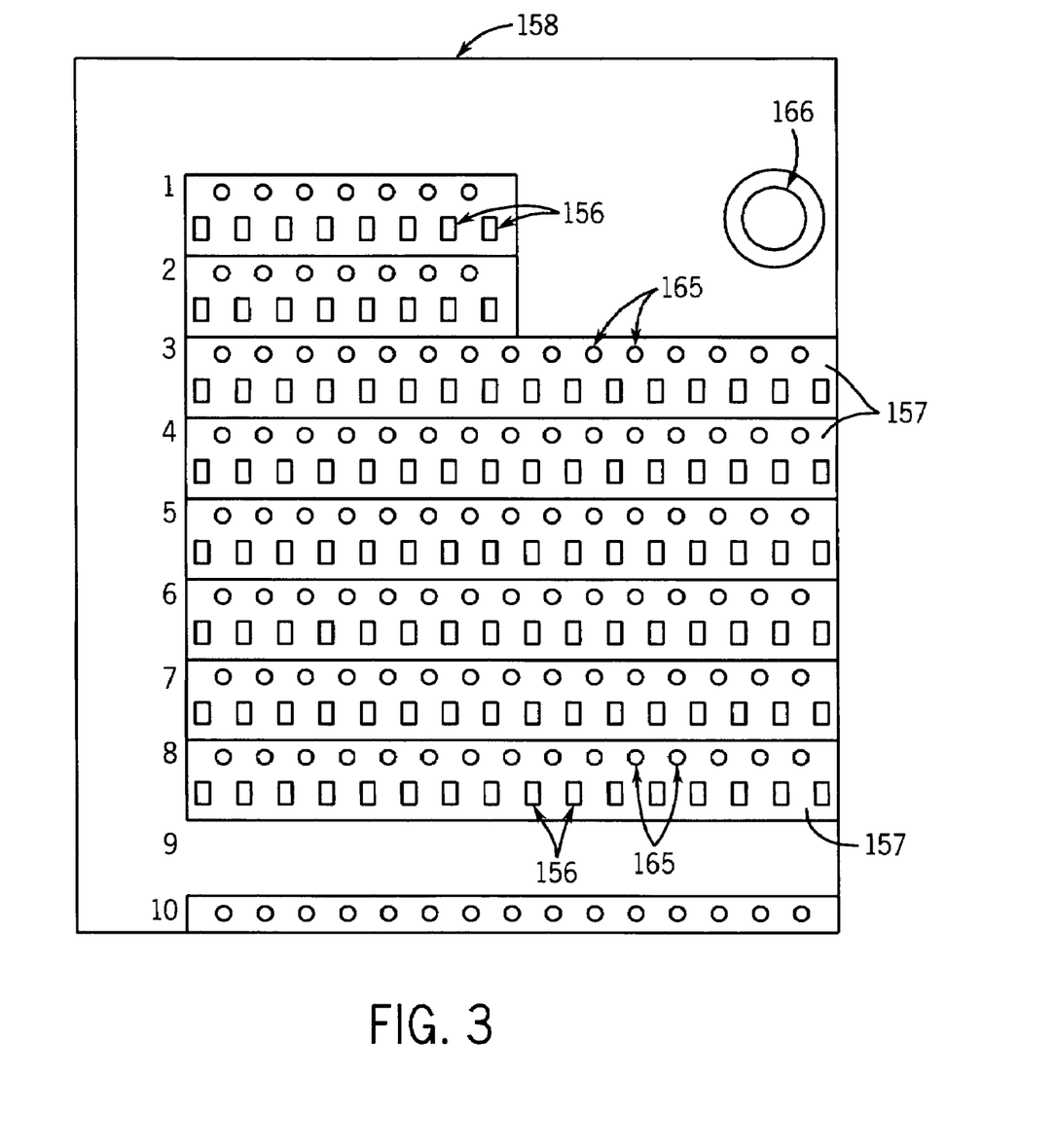
FIG. 3 is a top plan view showing a strip of tape affixed to a strip plate and supporting the electrical components to be assembled on the customized printed circuit board.
Figure 4:
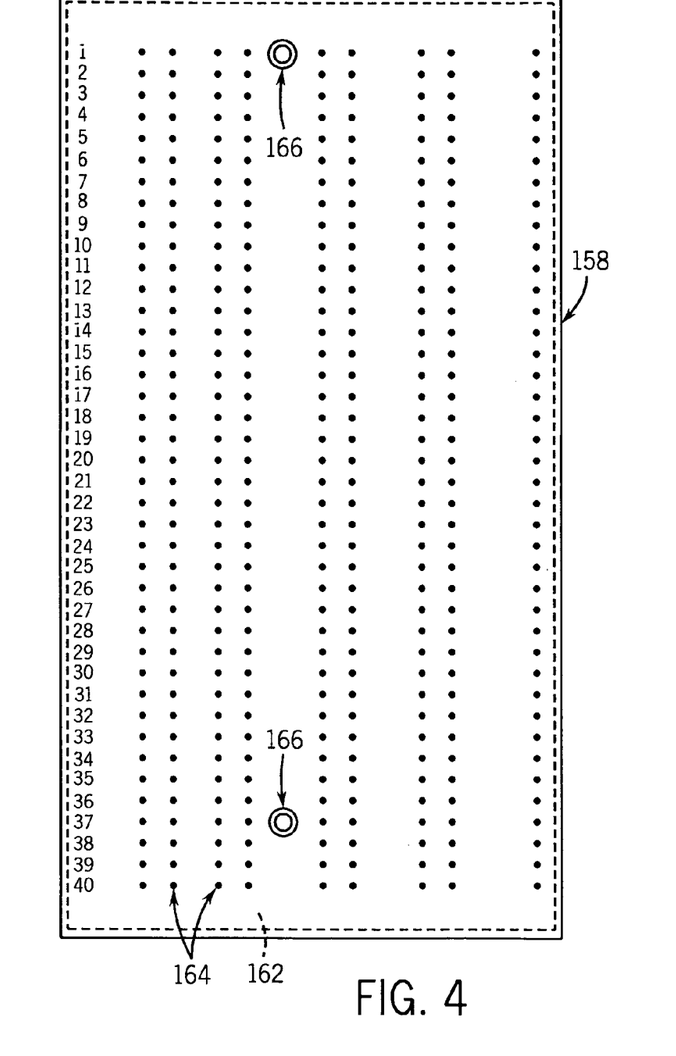
FIG. 4 is a top plan view showing a first embodiment of a strip plate for use in assembly of the customized printed circuit board.
Figure 5:
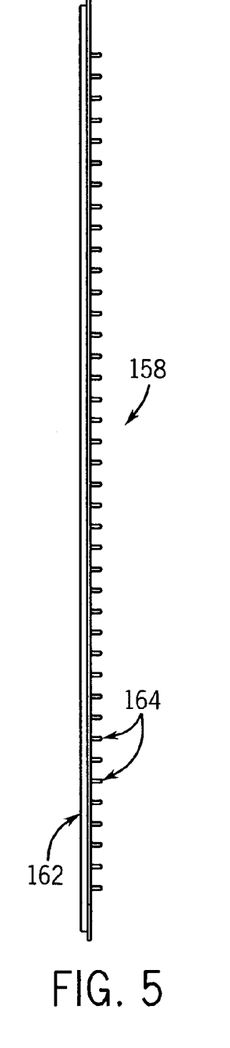
FIG. 5 is a side elevational view of the strip plate of FIG. 4.
Figure 6:
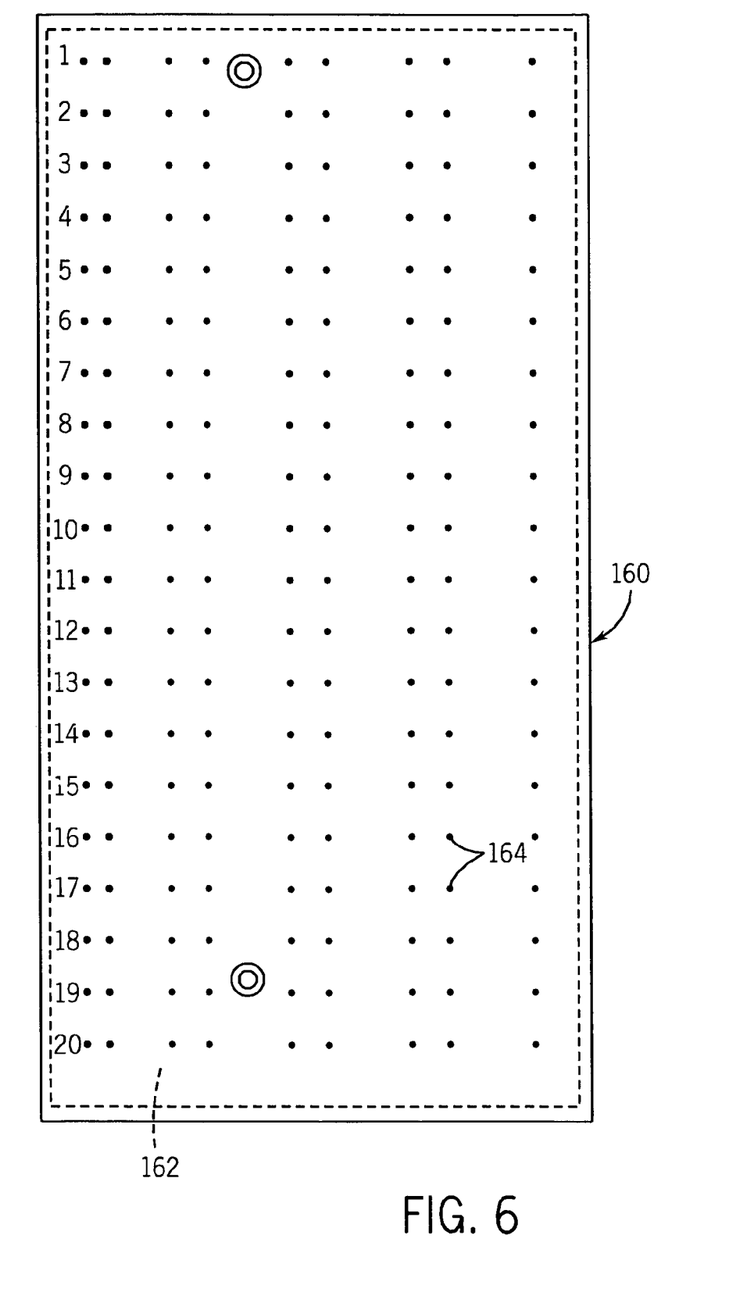
FIG. 6 is a top plan view showing a second embodiment of a strip plate for use in the assembly of the customized printed circuit board.
Figure 7:
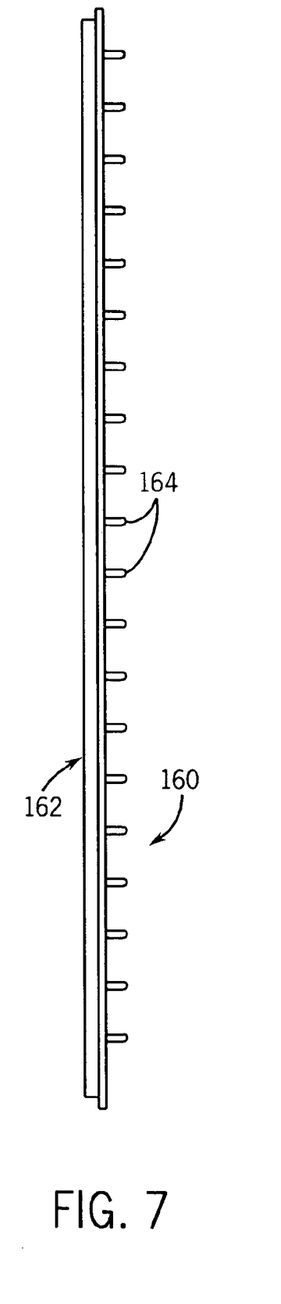
FIG. 7 is a side elevational view of the strip plate of FIG. 6.
Figure 8:
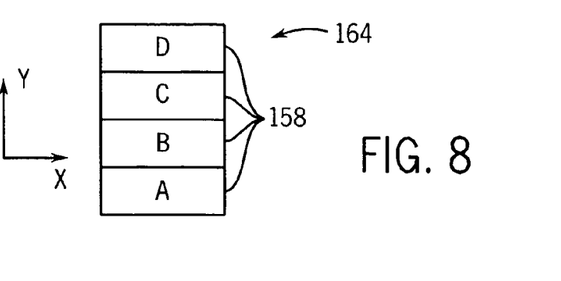
FIG. 8 is a schematic view showing a plurality of the strip plates positioned on a tray wagon base plate for use in the assembly of the customized printed circuit board.
Figure 9:
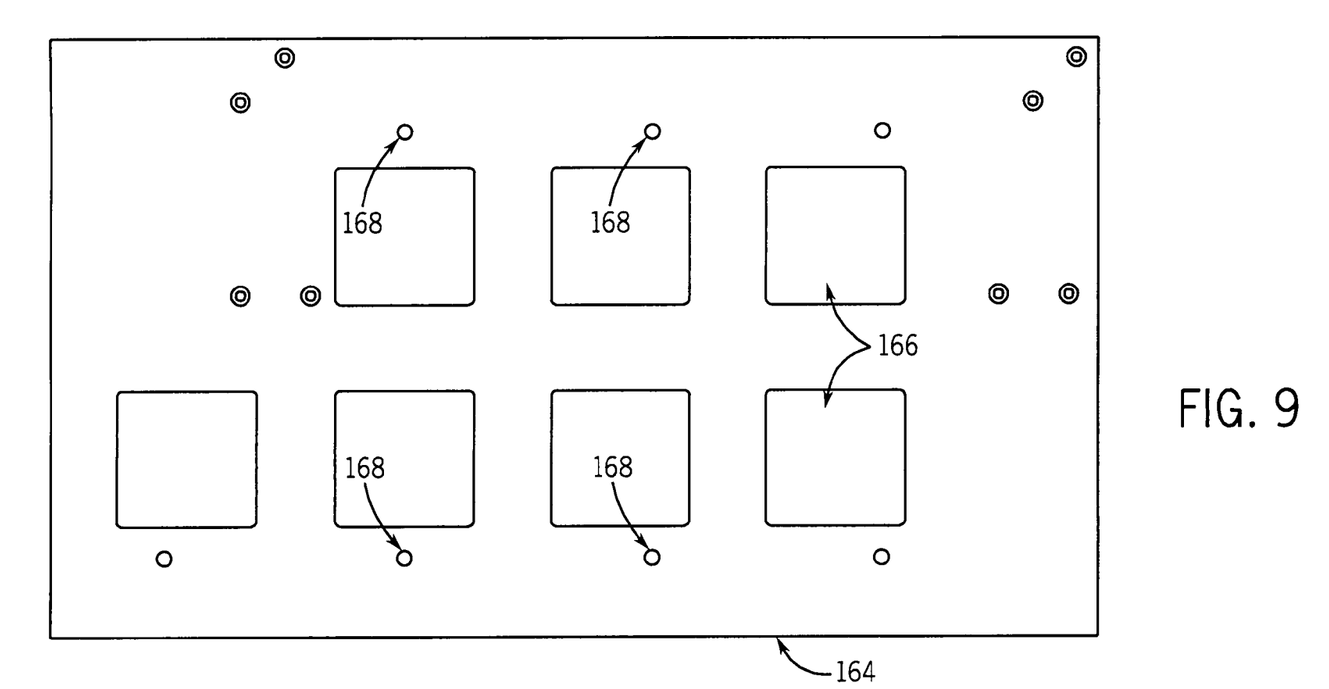
FIG. 9 is top plan view of a tray wagon base plate for use in the assembly of the customized printed circuit board.
Figure 10:
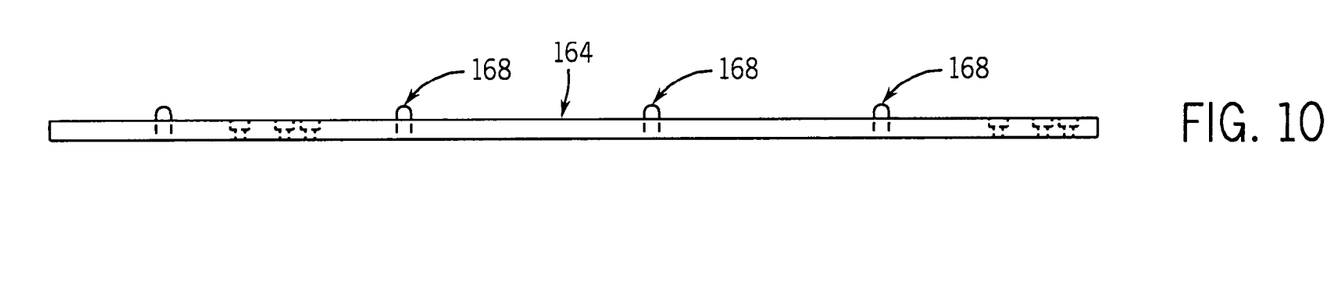
FIG. 10 is a side elevational view of view of the tray wagon base of FIG. 9.

Referring to FIG. 3, electrical components 156 (e.g., resistors, diodes, LEDs, capacitors, etc.) for assembly onto the PCB 75 are typically supplied on a reel of tape 157. The tape 157 (e.g., 8 mm) is cut and mounted on a strip plate 158. FIGS. 4-5 illustrate a plan view and a side elevation view, respectively, of a first embodiment of a strip plate 158. FIGS. 5-6 illustrate a plan view and a side elevation view of a second embodiment of a strip plate 160. Strip plate 160 is similar in construction to strip plate 158. As such, the following discussion of strip plate 158 will be understood to describe strip plate 160 as if fully provided herein. The strip plate 158 is generally flat and includes a substrate 162 (e.g., Duropol™) mounted with a series of rows of dowel pins 164. As illustrated in FIG. 3, the tape 157 includes openings 165 to receive the dowel pins 164 such that the tape 157 can be pressed on the strip plate 158. The dowel pins 164 of the strip plate 158 thereby locate placement of the tape 157 on the strip plate 158. The strip plates 158 further include a pair of mounting openings 166. FIG. 8 schematically illustrates how the strip plates 158 are mounted on a tray base plate 164, FIGS. 9-10. Each strip plate 158 is assigned a letter designation (e.g., A, B, C, or D) representative of a location on the tray base plate 164. A top view and a side elevation view of a preferred tray base plate 164 are illustrated in FIGS. 9-10, respectively. The tray base plate 164 includes general cutout sections 166 to reduce the weight of the tray base plate 164. The tray base plate 164 further includes mounting pins 168 configured to receive the mounting openings 166 (FIG. 6) so as to hold the position of the strip plate 158 on the tray base plate 164.

As illustrated in FIG. 8, each of the electrical components 156 on the tape 157 can be provided with a location on the series of strip plates 158 that can be programmed into the software program 55 with a letter designation (e.g., A, B, C, or D) and/or an X-Y coordinate and/or a strip plate row number or combination thereof. Other types of coordinate systems (e.g., polar, etc.) to locate each of the electrical components 156 can be employed and is not limiting on the invention. When identifying placement of a respective electrical component from a customer BOM and drawing files, the software program 55 is operable to call up the location of the stored electrical component 156 on the tape 157 of the respective strip plate 158 of the tray base plate 164, and communicates this location to the PCBAM 70 for grabbing the electrical component 156 from the tape 157 and assembling the component 156 onto the PCB 75. After all of the components 156 have been placed on the strip plates 158, the strip plates 158 are placed on a tray wagon base plate 164 for assembly on the PCB 75 by the PCBAM 70.

Referring back to FIG. 2, step 200 includes executing the generated machine instructions for assembling the PCB 75. Assembling the PCB 75 includes identifying the desired placement of an electrical component 156 according to the locations given in the kit list described above, and calling up the programmed location of the desired electrical component on the respective strip plate 158 of the tray base plate 164. The software program 55 instructs the processor 50 to communicate location and placement of the electrical component 156 in accordance to the kit list in the respective machine language to the PCBAM 70. The PCBAM 70 grabs the desired electrical component 156 from the programmed location on the strip plate 158 and assembles the electrical component 156 on the PCB 75 in accordance to the kit list. The locations given in the kit list include an alphabetical designation operable to indicate a designated location of the component 156 on the strip 157 of on any of four different strip plates 158 denoted by A, B, C, and D, along a respective strip row denoted by numerical designation, as illustrated in FIG. 3.

Step 205 includes generating a design of manufacturability (DOM) report that generally describes, highlights, and explains any potential manufacturing issues, gives feedback and help in production efficiency of the customized PCB 75, and reports any problems or issues that came up during assembly of the PCB 75. Step 210 generally includes shipment of the PCBs 75 to the customer. Step 210 further includes providing for a status update of the shipment of PCBs available or communicated to the user via the website. Step 215 is the end of the method 80.

The system 20 and the method 80 described above is preferably used to manufacture specialized prototypes and low volume PCB 75 and electronic assemblies, but the method 80 can be employed to assemble other types of board assemblies (e.g., game boards, etc.) and is not limiting on the invention. Each of the PCBs 75 is preferably machine assembled, however, one or more of the components (e.g., through hole components) can be hand soldered for small quantities and is not limiting on the invention.

The above discussion, examples, and embodiments illustrate my current understanding of the invention. However, since many variations of the invention can be made without departing from the spirit and scope of the invention, the invention resides wholly in the claims hereafter appended.

We claim:

1. A system for assembling a customized printed circuit board having a plurality of electrical components, comprising:
   an input device adapted for receiving sets of information from a plurality of users, each set of information including predetermined information corresponding to unique customized printed circuit boards to be assembled, the predetermined information including a list of the plurality of electrical components;
   a central processing unit operatively connected to the input device by a communications network, the central processing unit:
      receiving each set of information; and
      generating sets of assembly instructions in response to the sets of information;
   a carrier for supporting the plurality of components on the lists for each unique customized printed board to be assembled; and
   a machine operatively connected to the central processing unit for assembling each unique customized printed circuit board from the plurality of components supported on the carrier in response to a corresponding set of assembly instructions;
   wherein the carrier includes:
      a base plate; and
      a first strip plate mounted on the base plate for supporting a first set of the plurality of components thereon.

2. The system of claim 1 wherein the carrier includes a second strip plate mounted on the base plate, the second strip plate supporting a second set of the plurality of components thereon.

3. The system of claim 1 further comprising a strip of tape for affixing the plurality of components to the first strip plate.

4. A system for assembling a customized printed circuit board having a plurality of electrical components, comprising:
   an input device adapted for receiving sets of information from a plurality of users, each set of information including predetermined information corresponding to unique customized printed circuit boards to be assembled, the predetermined information including a list of the plurality of electrical components;
   a central processing unit operatively connected to the input device by a communications network, the central processing unit:
      receiving each set of information; and
      generating sets of assembly instructions in response to the sets of information;
   a carrier for supporting the plurality of components on the lists for each unique customized printed board to be assembled; and
   a machine operatively connected to the central processing unit for assembling each unique customized printed circuit board from the plurality of components supported on the carrier in response to a corresponding set of assembly instructions;
   wherein the input device includes an electronic order form for facilitating the input of the predetermined information for a set of information, the electronic order form prompting the user to enter the predetermined information.

5. A system for assembling a customized printed circuit board having a plurality of electrical components, comprising:
   an input device adapted for receiving sets of information from a plurality of users, each set of information including predetermined information corresponding to unique customized printed circuit boards to be assembled, the predetermined information including a list of the plurality of electrical components;
   a central processing unit operatively connected to the input device by a communications network, the central processing unit:
      receiving each set of information; and
      generating sets of assembly instructions in response to the sets of information;
   a carrier for supporting the plurality of components on the lists for each unique customized printed board to be assembled; and
   a machine operatively connected to the central processing unit for assembling each unique customized printed circuit board from the plurality of components supported on the carrier in response to a corresponding set of assembly instructions;
   wherein the predetermined information includes billing information.

6. A system for assembling a customized printed circuit board having a plurality of electrical components, comprising:
   an input device adapted for receiving sets of information from a plurality of users, each set of information including predetermined information corresponding to unique customized printed circuit boards to be assembled, the predetermined information including a list of the plurality of electrical components;
   a central processing unit operatively connected to the input device by a communications network, the central processing unit:
      receiving each set of information; and
      generating sets of assembly instructions in response to the sets of information;
   a carrier for supporting the plurality of components on the lists for each unique customized printed board to be assembled; and
   a machine operatively connected to the central processing unit for assembling each unique customized printed circuit board from the plurality of components supported on the carrier in response to a corresponding set of assembly instructions;
   wherein the predetermined information includes a bill of materials for a customized printed circuit board.

7. A system for assembling a customized printed circuit board having a plurality of electrical components, comprising:
   an input device adapted for receiving sets of information from a plurality of users, each set of information including predetermined information corresponding to unique customized printed circuit boards to be assembled, the predetermined information including a list of the plurality of electrical components;
   a central processing unit operatively connected to the input device by a communications network, the central processing unit:
      receiving each set of information; and
      generating sets of assembly instructions in response to the sets of information;

a carrier for supporting the plurality of components on the lists for each unique customized printed board to be assembled; and a machine operatively connected to the central processing unit for assembling each unique customized printed circuit board from the plurality of components supported on the carrier in response to a corresponding set of assembly instructions;

wherein the predetermined information includes a graphic image of a customized printed circuit board.

8. A system for assembling a customized printed circuit board having a plurality of electrical components, comprising:

an input device adapted for receiving sets of information from a plurality of users, each set of information including predetermined information corresponding to unique customized printed circuit boards to be assembled, the predetermined information including a list of the plurality of electrical components;

a central processing unit operatively connected to the input device by a communications network, the central processing unit:
receiving each set of information; and
generating sets of assembly instructions in response to the sets of information;

a carrier for supporting the plurality of components on the lists for each unique customized printed board to be assembled; and a machine operatively connected to the central processing unit for assembling each unique customized printed circuit board from the plurality of components supported on the carrier in response to a corresponding set of assembly instructions;

wherein the communications network is the internet.

* * * * *